Figure 1:
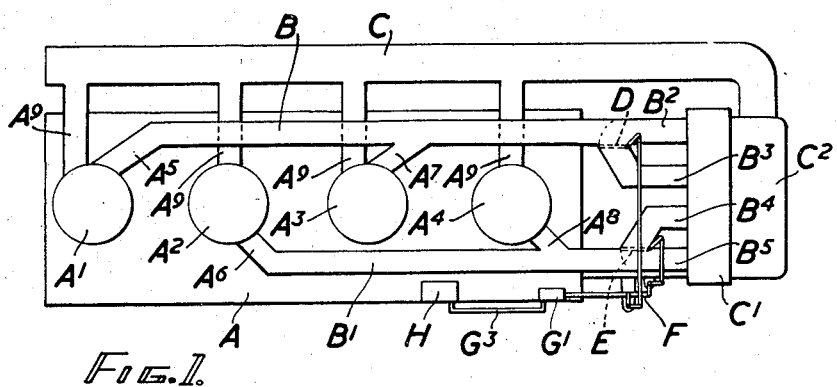

June 17, 1958 W. G. COWLAND 2,838,907
POWER UNITS COMPRISING AN INTERNAL COMBUSTION ENGINE
AND AN EXHAUST DRIVEN TURBO-SUPERCHARGER
Filed Feb. 3, 1953 3 Sheets-Sheet 1

Inventor
William G. Cowland

By Watson, Cole, Grindle and Watson
Attorneys

Inventor
William G. Cowland

United States Patent Office 2,838,907
Patented June 17, 1958

2,838,907

POWER UNITS COMPRISING AN INTERNAL COMBUSTION ENGINE AND AN EXHAUST DRIVEN TURBO-SUPERCHARGER

William Geoffrey Cowland, London, England, assignor to D. Napier & Son Limited, London, England, a company of Great Britain Application February 3, 1953, Serial No. 334,846

Claims priority, application Great Britain February 7, 1952

3 Claims. (Cl. 60—13)

This invention relates to power units of the kind comprising an internal combustion engine and an exhaust driven turbo-supercharger, that is to say an assembly comprising a turbine arranged to be driven by the exhaust gases from the internal combustion engine and to drive a compressor which delivers the gaseous charge of air or combustible mixture under pressure to the internal-combustion engine.

The invention is particularly but not exclusively concerned with power units of the above kind for traction and similar purposes where a high torque is required at relatively low engine speeds and in which a correspondingly high torque is not required or a considerably reduced torque only is needed over the upper end of the engine speed range, and it is an object of the invention to provide a form of power unit which will satisfy these requirements to a reasonable degree.

In a power unit of the kind referred to according to the present invention the nozzles or the equivalent of the turbine are divided into at least two sections fed by separate exhaust conduits and a valve or valves are provided whereby the number of such exhaust conduits to which the exhaust port or each exhaust port of the engine is connected can be varied so that the exhaust port or each exhaust port can be connected to a smaller number of nozzles when the engine is operating at relatively low speeds than when the engine is operating at relatively high speeds.

Generally the internal combustion engine will be of the multi-cylinder type and in this case, in order to take advantage of the so called "Buchi" effect, that is to say the impulse effect of a series of separate puffs or "slugs" of exhaust gas being delivered to each nozzle, the cylinders of the engine will preferably be divided into sets each comprising one or more cylinders whose exhaust port opening periods do not overlap materially that it to say do not overlay to an extent sufficient to impair efficient operation are connected to each of the exhaust conduits.

In one such arrangement according to the invention valve controlled interconnections may be provided between the exhaust conduits such that, by opening or closing the valve or valves which control such interconnection or interconnections, each of the conduits can, at will, be brought into communication with or cut off from at least one of the other conduits so as respectively to increase or reduce the number of nozzles with which each exhaust port communicates.

Alternatively exhaust ports of each set of cylinders the opening periods of the exhaust ports of which do not materially overlap, may communicate with a main exhaust conduit which in turn communicates with two branch exhaust conduits leading to different sections of the turbine nozzles and the valve apparatus may then be arranged to cut off at will communication between each main exhaust conduit and one of its associated branch exhaust conduits.

In any case the arrangement of the valve apparatus and of the exhaust conduits and passages in power units according to the invention will preferably be such that, when any valve is in the position in which it carries exhaust gas from a cylinder or set of cylinders to be delivered to two sections of the nozzles of the turbine, each "slug" of exhaust gas reaching the valve will tend to be split into two approximately equal parts which pass, with as little loss of energy as possible, respectively to the two appropriate sections of the turbine nozzles.

Moreover while the valve apparatus controlling the number of sections of the turbine nozzles with which the exhaust port or each exhaust port of the engine communicates may be arranged to be hand-controlled, so as to be controllable by an operator, it will in most cases be arranged to be automatically controlled by speed-responsive apparatus so as to reduce that number of sections at engine speeds below a predetermined value, and increase the number of sections at engine speed above such predetermined value.

Figure 2:
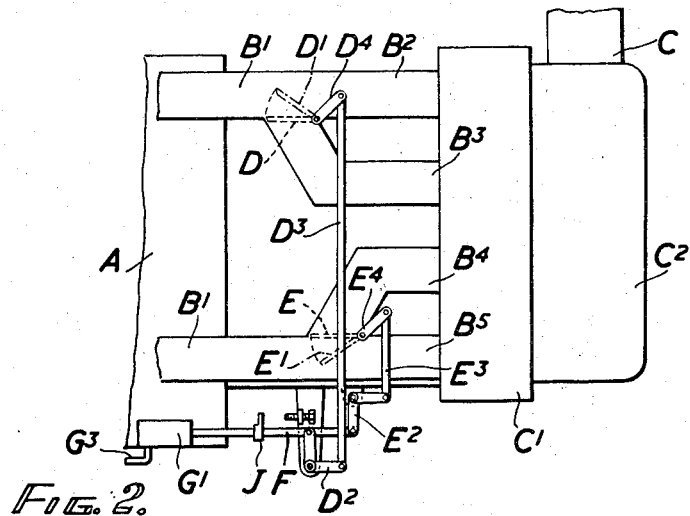
Figure 3:
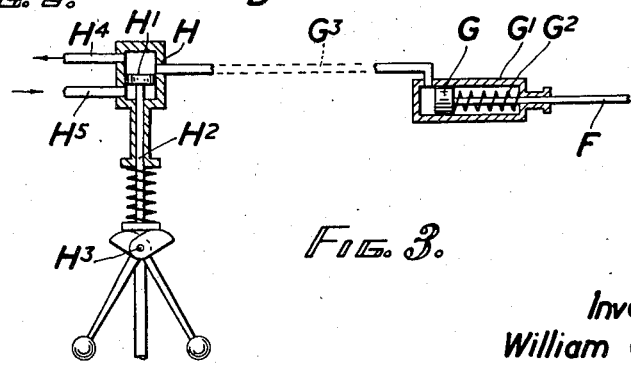

Examples of arrangements according to the invention are illustrated diagrammatically in the accompanying drawings, in which Figure 1 is a diagrammatic plan view of a power unit according to the invention having a four-cylinder internal combustion engine, Figure 2 is a diagrammatic plan view on an enlarged scale showing the valve control apparatus employed in the arrangement shown in Figure 1, Figure 3 is a diagrammatic view of apparatus by which the valve control apparatus employed in the construction shown in Figures 1 and 2 can be automatically controlled by a speed-responsive governor.

Figure 4:
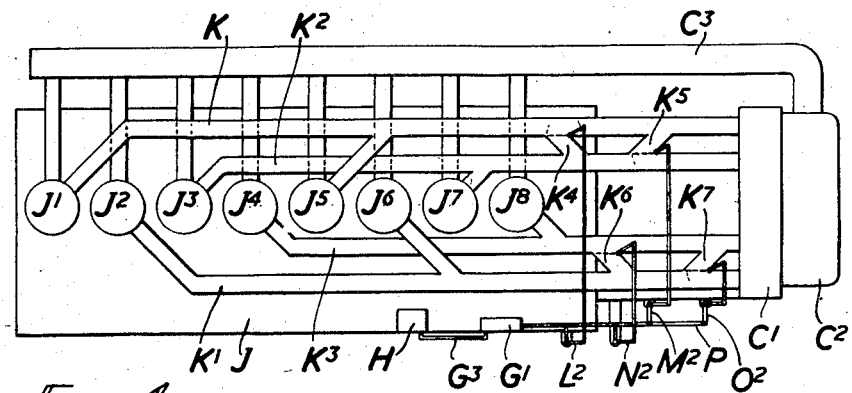
Figure 5:
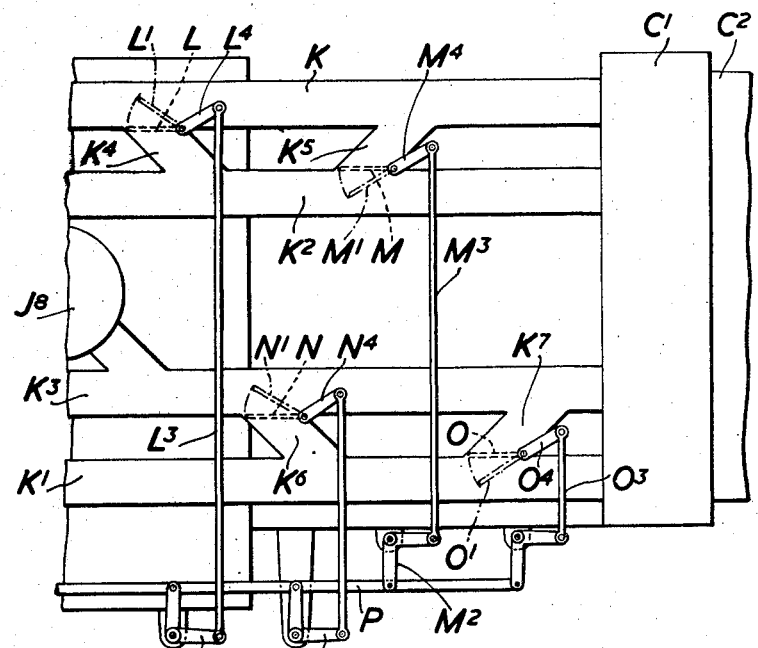
Figure 6:
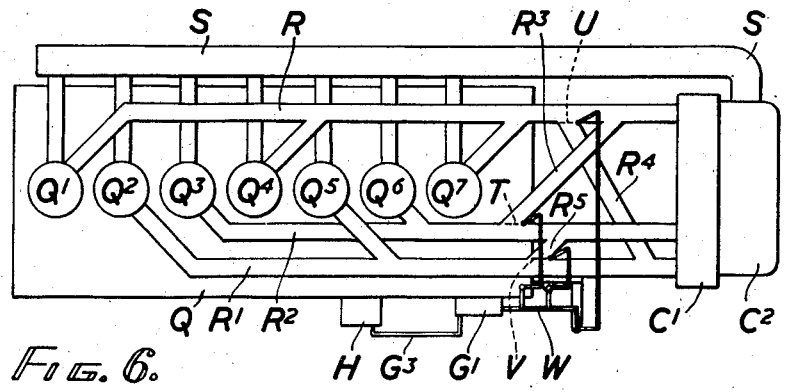
Figure 7:
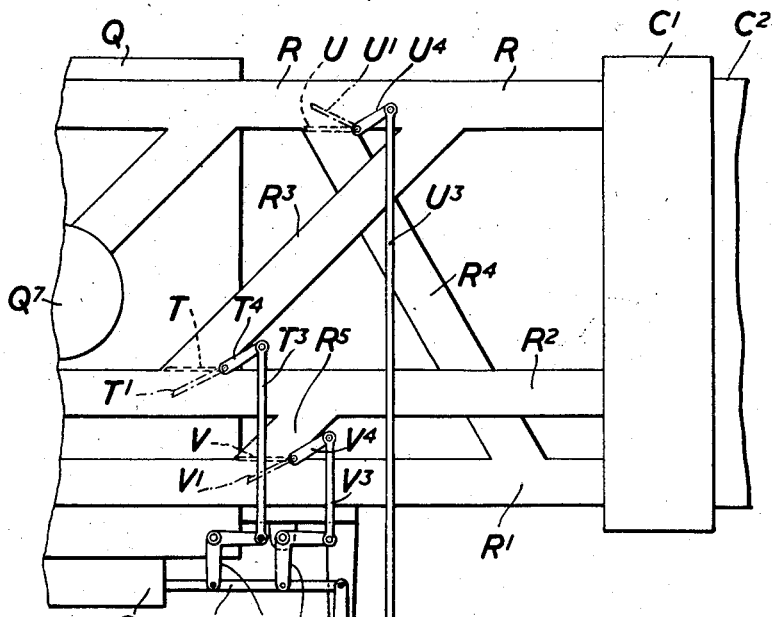

Figure 4 is a similar view to Figure 1 of a power unit according to the invention having an eight-cylinder internal combustion engine, Figure 5 is an enlarged diagrammatic plan view of the control valve apparatus employed in the arrangement shown in Figure 4, Figure 6 is a similar view to Figure 1 of a power unit according to the invention having a seven-cylinder internal combustion engine, and Figure 7 is an enlarged diagrammatic plan view of the valve control apparatus employed in the construction shown in Figure 6.

In the example of the invention diagrammatically illustrated in Figures 1, 2 and 3 the power unit comprises an internal combustion engine A having four cylinders $A^1$, $A^2$, $A^3$, $A^4$, having exhaust ports $A^5$, $A^6$, $A^7$, $A^8$ and inlet ports $A^9$.

The engine is of the four-stroke cycle type and may be assumed to have the normal firing order 1, 3, 4, 2 so that there is no overlap of the opening periods of the exhaust ports $A^5$ and $A^7$ or of the exhaust ports $A^6$ and $A^8$.

The exhaust ports $A^5$ and $A^7$ communicate with a common exhaust conduit B while the exhaust ports $A^6$ and $A^8$ communicate with a common exhaust conduit $B^1$, all the inlet ports $A^9$ communicating with a common inlet manifold C. Mounted adjacent to one end of the engine A is an exhaust-driven turbo blower of known general type comprising a turbine section $C^1$ and a centrifugal compressor $C^2$ the outlet of which is connected, as shown, to the inlet manifold C. The normal annular nozzle ring of the turbine $C^1$ is divided, in a manner known per se, into four sections, and these sections are arranged to be fed with exhaust gases respectively from four branch exhaust conduits $B^2$, $B^3$, $B^4$, $B^5$ of which the conduits $B^2$, $B^3$ are branches of the conduit B while the conduits $B^4$, $B^5$ are branches of the conduit $B^1$.

Arranged at the junction of the conduits B, $B^2$, $B^3$, and $B^1$, $B^4$, $B^5$ are flap valves each of which has two positions indicated in Figure 2 respectively by the reference letters D and $D^1$ for one valve and E and $E^1$ for the other valve. The valves D and E are arranged to be operated simultaneously from an operating rod F which is connected to the valve D, $D^1$ through a bell crank lever $D^2$, a link $D^3$ and a lever $D^4$ and is connected to the valve E, $E^1$ by a bell crank lever $E^2$, a link $E^3$ and a lever $E^4$ in such manner that the two valves will be moved simultaneously from the positions D and E respectively into the positions $D^1$ and $E^1$ or vice versa. It will also be apparent that when the valves occupy the positions D and E the conduits B and $B^1$ communicate only with the conduits $B^2$ and $B^5$ respectively so that the exhaust ports $A^5$ and $A^7$ communicate only with that section of the turbine nozzle ring which is fed by the conduit $B^2$, while the exhaust ports $A^6$ and $A^8$ communicate only with that section of the turbine nozzle ring which is fed by the conduit $B^5$, whereas when the valves occupy the positions $D^1$ and $E^1$ each of the exhaust ports $A^5$ and $A^7$ communicates with the two sections of the nozzle ring fed respectively by the conduits $B^2$ and $B^3$ while each of the ports $A^6$ and $A^8$ communicates with the two sections of the nozzle ring fed by the conduits $B^4$ and $B^5$. Moreover the arrangement is such that when the valves occupy the positions $D^1$, $E^1$ each slug of exhaust gas which passes along the exhaust conduit B or $B^1$ is split by the valve $D^1$ or $E^1$ into two substantially equal halves which pass respectively through the passages $B^2$ and $B^3$ or $B^4$ and $B^5$ as the case may be. The rod F is arranged to be moved automatically from one position to the other by a fluid-operated servo piston G arranged in a cylinder $G^1$ and acted upon by a spring $G^2$ normally tending to maintain the piston G and hence the rod F in the position shown, in which the valves occupy the positions D and E. The end of the cylinder $G^1$ remote from the spring $G^2$ is connected by a passage $G^3$ to a control valve cylinder H containing a piston valve $H^1$ arranged to be operated through a rod $H^2$ by a centrifugal governor $H^3$ driven from the engine, the valve $H^1$ being so arranged that below a predetermined engine speed it will occupy the position shown, in which the passage $G^3$ is connected to a relief passage $H^4$, while above such predetermined engine speed the valve $H^1$ brings the passage $G^3$ into communication with a source of fluid pressure $H^5$ so that the piston G and hence the rod F is moved to the right to bring the valves into the positions $D^1$, $E^1$. An adjustable stop indicated at J may be provided to determine the position which the rod F and hence the valves will occupy when in their positions $D^1$, $E^1$.

For convenience the governor mechanism and valve H are shown diagrammatically in Figure 1 by the reference letter H.

In the arrangement according to the invention shown in Figures 4 and 5 the power unit comprises an internal combustion engine J having eight cylinders $J^1$, $J^2$, $J^3$, $J^4$, $J^5$, $J^6$, $J^7$, $J^8$, the engine being of the four-stroke cycle type with a standard firing order for the cylinders so that there is no overlap between the periods of opening of the exhaust ports of the cylinders $J^1$ and $J^5$ or of the cylinders $J^2$ and $J^6$ or of the cylinders $J^3$ and $J^7$ or of the cylinders $J^4$ and $J^8$. The exhaust ports of the cylinders $J^1$ and $J^5$ are connected to an exhaust conduit K, those of the cylinders $J^2$ and $J^6$ are connected to an exhaust conduit $K^1$, those of the cylinders $J^3$ and $J^7$ to an exhaust conduit $K^2$, and those of the cylinders $J^4$ and $J^8$ to an exhaust conduit $K^3$, while the inlet ports of all the cylinders are connected to a common inlet manifold $C^3$.

The exhaust conduits K and $K^2$ are provided with interconnecting conduits $K^4$ and $K^5$ controlled respectively by valves L and M which can occupy either the positions indicated by the reference letters L and M or the alternative positions indicated by the reference letters $L^1$ and $M^1$, the general direction of the conduits $K^4$ and $K^5$ being inclined oppositely as indicated in relation to the conduits K and $K^2$.

Similarly the conduits $K^1$ and $K^3$ are provided with interconnecting conduits $K^6$ and $K^7$ controlled respectively by valves N and O which can either occupy the positions indicated by the reference letters N and O or the alternative positions indicated by the reference letters $N^1$ and $O^1$.

The valves L, M, N and O are arranged to be controlled simultaneously by a control rod P, which corresponds to the control rod F in the arrangement shown in Figure 1, and is arranged to be operated by a piston G under the control of an engine driven governor $H^3$ through a control valve $H^1$ in the same manner as the rod F in that construction so that below a certain engine speed the rod P occupies the position shown with the valves in the positions O, L, M and N, while above such predetermined engine speed the rod P occupies an alternative position somewhat further to the right than is shown in Figure 5, in which position the valves occupy the positions $L^1$, $M^1$, $N^1$, $O^1$. To this end it will be seen that the valves are connected to the control rod P by linkages and levers comprising in the case of the valve L a bell crank lever $L^2$, a link $L^3$ and a lever $L^4$, in the case of the valve M a bell crank lever $M^2$, a link $M^3$ and a lever $M^4$, in the case of the valve N a bell crank lever $N^2$, a link $N^3$ and a lever $N^4$, and in the case of the valve O a bell crank lever $O^2$, a link $O^3$ and a lever $O^4$.

As in the construction shown in Figures 1 and 2 an exhaust-driven turbo supercharger is arranged at one end of the engine comprising a turbine section $C^1$ and a centrifugal compressor section $C^2$ the delivery passage of which in this case is connected to the inlet manifold $C^3$ while the four exhaust conduits K, $K^1$, $K^2$, $K^3$ lead respectively to the four sections of the nozzle ring or the equivalent of the turbine $O^1$.

In this construction it will be seen that when the rod P occupies the position shown, i. e. over the lower engine speed range, so that the valves occupy the positions L, M, N and O, the exhaust port of each of the cylinders will be connected to one section only of the nozzle ring whereas when the rod P occupies its other position, so that the valves are in the positions $L^1$, $M^1$, $N^1$ and $O^1$, the exhaust port of each cylinder will be connected to two of the sections of the nozzle ring of the turbine D. Moreover the arrangement of the valves is such that when in the positions $L^1$, $M^1$, $N^1$, $O^1$ each of the valves tends to split into two approximately equal halves, each slug of exhaust gases passing down the conduit K, $K^1$, $K^2$ or $K^3$ partially across which the valve extends so that approximately half such slug is diverted into the other associated conduit.

In the arrangement shown in Figure 6 the invention is shown as applied to a unit comprising an internal combustion engine Q having seven cylinders $Q^1$, $Q^2$, $Q^3$, $Q^4$, $Q^5$, $Q^6$, $Q^7$. In this construction of engine the timing of the cylinders is such that the open periods of the exhaust ports of the cylinders $Q^1$, $Q^4$ and $Q^7$ do not overlap, those of the cylinders $Q^2$ and $Q^5$ do not overlap, and those of the cylinders $Q^3$ and $Q^6$ do not overlap. The exhaust ports of the cylinders $Q^1$, $Q^4$, $Q^7$ are connected to an exhaust conduit R while those of the cylinders $Q^2$ and $Q^5$ are connected to an exhaust conduit $R^1$ and those of the cylinders $Q^3$ and $Q^6$ are connected to an exhaust conduit $R^2$, the inlet ports of all the cylinders being connected to a common inlet manifold S.

An interconnecting passage $R^3$ controlled by a valve T is provided between the exhaust conduits R and $R^2$, an interconnecting passage $R^4$ controlled by a valve U is provided between the exhaust conduits R and $R^1$, while an interconnecting conduit $R^5$ controlled by a valve V is provided between the conduits $R^1$ and $R^2$, these interconnecting conduits being inclined to their associated conduits in the manner indicated, while the valves can occupy either the positions indicated by the reference letters T, U and V or the alternative positions indicated by the reference letters $T^1$, $U^1$ and $V^1$.

The valves are arranged to be simultaneously controlled from a control rod W, corresponding to the control rods F and P respectively in the arrangements shown in Figures 1, 2 and 3 and in Figures 4 and 5, and, to this end, the rod W is connected to the valve T by a bell crank lever $T^2$, a rod $T^3$ and a lever $T^4$, to the valve U by a bell crank lever $U^2$, a rod $U^3$ and a lever $U^4$, and to the valve V by a bell crank lever $V^2$, a link $V^3$ and a lever $V^4$. The rod W is, further, arranged to be controlled by a piston similar to the piston G in Figures 1, 2 and 3 under the control of a speed-responsive governor $H^3$ through a valve $H^1$, whereby the valves occupy the positions T, U and V below a predetermined engine speed and the positions $T^1$, $U^1$ and $V^1$ at speeds above such predetermined engine speed.

The exhaust conduits R, $R^1$ and $R^2$ are connected to different nozzle sections of the turbine $C^1$ of an exhaust-driven turbo compressor the outlet from the compressor section $C^2$ of which is connected to the induction manifold S, the section of the nozzle ring in this arrangement fed by the conduit R being larger than either of the two sections fed respectively by the conduits $R^1$ and $R^2$.

It will be seen that with this arrangement, below the predetermined engine speed referred to (that is when the valves occupy the positions T, U and V) each of the exhaust ports will communicate with one section only of the nozzle ring of the turbine D whereas above such predetermined engine speed (when the valves occupy the positions $T^1$, $U^1$, $V^1$) each of the exhaust ports will communicate with two of the nozzle ring sections of the turbine. Moreover each slug of exhaust gas ejected through an exhaust port into one of the exhaust conduits R, $R^1$, or $R^2$ will tend to be divided into approximately equal halves by the appropriate valve so that each half is delivered to a different section of the turbine nozzle ring.

What I claim as my invention and desire to secure by Letters Patent is:

1. A power unit comprising a multi-cylinder internal combustion engine, at least two exhaust conduits each individually connected to and in constant communication with the exhaust port of at least one cylinder to receive exhaust gas therefrom during successive periods which do not overlap, a turbo supercharger including a compressor connected to supply the gaseous charge to the engine cylinders, and a turbine having nozzles through which the exhaust gas is delivered to the turbine rotor and including at least two sections connected respectively to the exhaust conduits, an interconnection between each exhaust conduit and one of the other exhaust conduits at a location remote from and independent of the connection between said conduits and their respective exhaust ports, and valve apparatus controlling the interconnections and operable to selectively establish or interrupt communication between each of the conduits and at least one of the other conduits.

2. A power unit as claimed in claim 1 in which said valve apparatus is constructed to deliver, upon establishing of communication between conduits, to the associated interconnection approximately half of each slug of exhaust gas passing through the conduit into which it was originally delivered.

3. A power unit as claimed in claim 2 including speed responsive means and an interconnection between the speed responsive means and the valve apparatus which acts in a direction to close the valves when the engine speed drops below a predetermined value and in a direction to open the valves when the engine speed rises above that predetermined value.

References Cited in the file of this patent

UNITED STATES PATENTS

| | | |
|---|---|---|
| 1,816,737 | Moss | July 28, 1931 |
| 1,816,787 | Moss | July 28, 1931 |
| 1,856,024 | Büchi | Apr. 26, 1932 |
| 2,147,935 | Steiner | Feb. 21, 1939 |
| 2,444,644 | Fülleman | July 6, 1948 |
| 2,581,600 | Pateras Pescara | Jan. 8, 1952 |